Sept. 2, 1924.

H. N. WHEELER

FOOT MEASURING STICK

Filed Dec. 17, 1923

1,507,539

Inventor
Harry N. Wheeler,
By Wilkinson & Giusta
Attorneys.

Patented Sept. 2, 1924.

1,507,539

UNITED STATES PATENT OFFICE.

HARRY N. WHEELER, OF MONTGOMERY, ALABAMA.

FOOT-MEASURING STICK.

Application filed December 17, 1923. Serial No. 681,222.

*To all whom it may concern:*

Be it known that I, HARRY N. WHEELER, a citizen of the United States, residing at Montgomery, in the county of Montgomery and State of Alabama, have invented certain new and useful Improvements in Foot-Measuring Sticks; and I do hereby declare the following to be a full, clear, and exact description of the invention, such as will enable others skilled in the art to which it appertains to make and use the same.

The present invention relates to improvements in measuring sticks and consists more particularly in a stick for taking foot measurements prior to fitting the customer with shoes.

It is an object of the invention to provide an improved measuring stick in which, in addition to the overall measurement of the foot, the arch measure is also taken in order that the two measurements may be checked and any abnormality in the foot taken into consideration in the selection and fitting of the shoes.

It is another object of the invention to provide in a stick of this kind the additional taking of width measurements and of providing a compact device in which these various measurements may be taken quickly and accurately without discomfort or loss of time to the customer and without entailing undue trouble or loss of time on the part of the clerk.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of an improved measuring stick constructed according to the present invention.

Figure 2 is a side view thereof.

Figure 1:
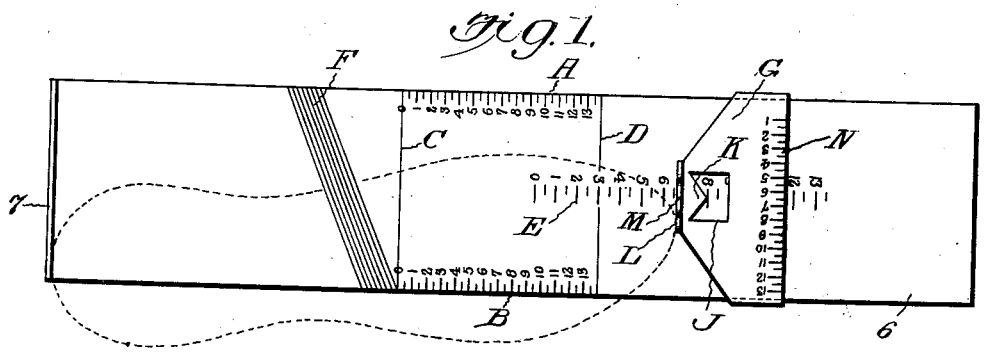
Figure 3:
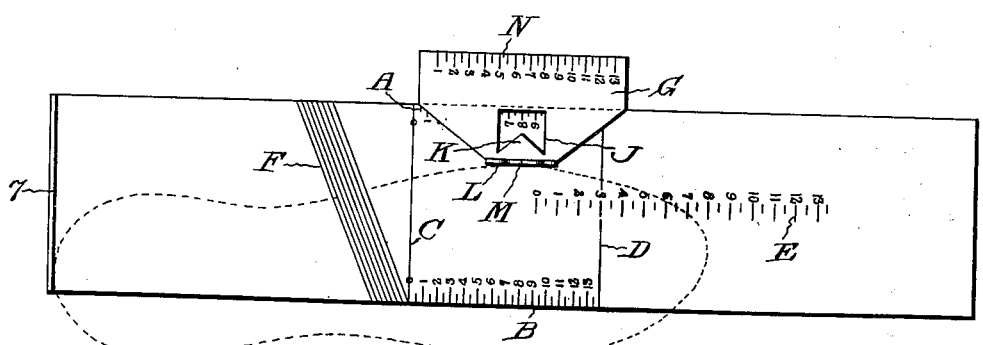
Figure 3 is also a plan view with the parts in the position for taking the arch measure.
Figures 4, 5:
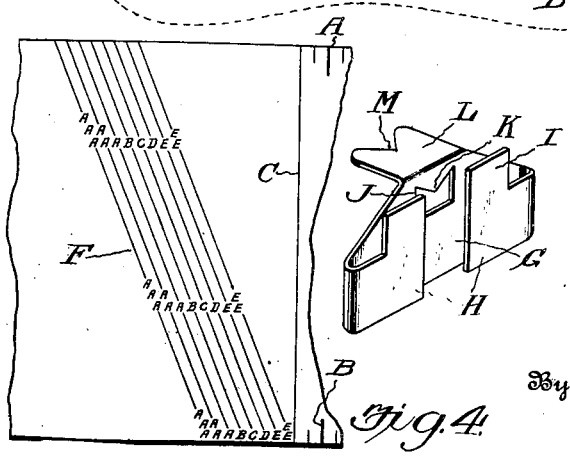
Figure 4 is an enlarged fragmentary plan view of that portion of the stick containing the width measurement lines and markings.
Figure 5 is a perspective view of the slide.

Referring more particularly to the drawings, 6 designates the stick which is preferably, although not necessarily, of metal, being of a suitable width and length to accommodate the foot and having the upturned heel piece 7 against which the heel of the foot is rested as for instance according to the position of the foot shown in dotted lines in Figures 1 and 3.

At the intermediate portion of the stick are the lateral scales A and B numbered preferably from 0 to 13 and comprised between the transverse division lines C and D. In addition, there is a scale E also having numbers from 0 to 13 in order to accord with the lateral scales A and B, although the markings of the central scale E are more widely separated than the corresponding markings upon the lateral scales, and the origin point of the central scale E is considerably off-set from the origin points of the lateral scales A and B which latter origin points coincide with the division line C.

Figure 2:
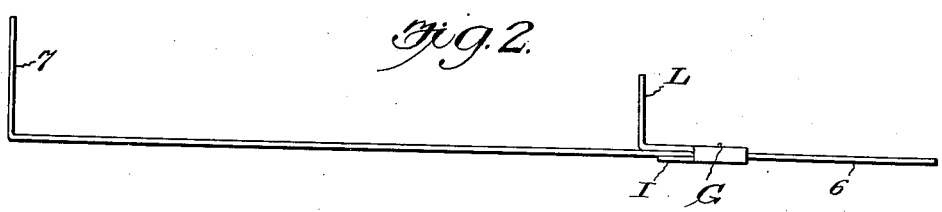

The stick 6 is provided with the width indicating lines F, these lines being transversely of the stick or rather diagonally or at an angle to a transverse line. These various lines F indicate different widths in the foot, and they are marked with letters to indicate widths in accordance with the well known practice of designating widths in shoes. The scale on which the Figures 1, 2 and 3 is made has rendered it impracticable to show the arrangement of these letters, but the letters preferably occur in a three fold degree for a purpose later to be stated.

The stick 6 is adapted to receive the slide G which is also preferably of metal and is provided with the inturned flanges H which extend beneath the stick and are provided with the forwardly projecting tongues I. The top portion of the slides G is extended forwardly at its central point and a window or opening J is made at this central point in order to view the scales therethrough. A triangular shaped pointer K extends from the forward toward the rear portion of the opening J and at the front most portion of the slide is the upstanding lug L having the V-shaped notch M.

In the use of the device, the slide G is removed from the stick and is fitted to the side of the stick as indicated in Figure 3, the projections I and the projecting nature of the top plate of the slide adapted for this purpose. The notch M in the lug L is made to register with the great toe joint (better known as bunion joint). At this stage in order to get an accurate measurement, it is advisable that the clerk place his fingers under the stick, just under the person's arch, then place the thumb on top of the foot or on the instep and press the foot tightly to the stick. This will cause the foot to stretch (if it has any stretch). The pointer K will show in connection with either of the lateral scales A and B, A in the instance illustrated, the arch measure.

The slide is then put on the stick and the heel brought against the heel plate 7, as for instance indicated in Figure 1, although the foot may take up a more central position upon the stick if desired. The slide G is then brought down until the lug L rests against the foot. In this condition the pointer K shows in connection with the scale E the overall length of the foot. This appears to be "8" in Figure 1, which is by way of example merely.

The arch measure should tally with the overall measure registered upon the scale E. If it does, this is a normal foot so far as length is concerned, but in actual practice, it is found that 80% are not normal. In most cases, the overall measure is taken only, and shoes are fitted to the feet on this basis, as a consequence of which the 80% of abnormal feet are improperly fitted and this is the cause of great injury. On the great toe joint you may get, for example, size 8, and on full length measure the size obtained may be 9. In this case, the clerk will know not to fit the shoe standard, but easy half size to size longer. On the other hand, you may have the reverse case, and it will be necessary to fit the shoe shorter than standard.

Now, to obtain width, the foot is taken off the stick and placed sidewise against part 7 with the little toe resting sidewise against this heel piece 7. The slide G is moved along the stick 6 from the position shown in Figure 1 until it arrives against the side of the foot. The foot is squeezed by pressing the slide firmly against the great toe joint. The slide G is provided transversely with a scale N with numbers running from 1 to 13, and the markings in this scale are to be read in conjunction with the diagonal lines F of the width scale. If the length shoe required was, for instance, 9, select the marking opposite the number 9 of the scale N and compare this numbered marking with the width line F over which it lies when the slide is squeezed against the foot. The marking on this particular width line will indicate the width of shoe that should be worn. For example, the length may prove to be 9 and the width AA, resulting in the size 9 AA shoe.

It will be apparent then by use of the lateral and the central scales A, B and E that it will be impracticable to make any mistake in the length of shoe and the crippling of feet will be avoided by misfits.

It is obvious that various changes and modifications may be made in the details of construction and design of the above specifically described embodiment of this invention without departing from the spirit thereof, such changes and modifications being restricted only by the scope of the following claims.

What is claimed is:

1. A measuring stick comprising a stick member having a heel piece, an arch scale upon the intermediate portion of the stick for showing the arch measure and a central scale off-set from the arch scale and having more widely separated markings than said arch scales for showing the overall length of the foot in the same terms as the arch measure for easy comparison, and a slide movable longitudinally on the stick in both crosswise and lengthwise positions, and having an index for use in connection with the two scales.

2. A measuring stick comprising a stick member having a heel piece and provided with arch scales along its side edges at its intermediate part with closely assembled markings and division lines extending transversely of the stick and coinciding with the origin points of said arch scales and with the terminal points thereof, said stick also having a central scale having a number of markings similar to the arch scales, but being off-set longitudinally from the arch scales and having the markings thereof more widely separated than said arch scales whereby to give the overall measure of the shoe in the same terms as the arch measure obtained from the arch scales, a number of width lines extending diagonally of the stick between the heel piece and the arch scales and having three sets of letters at spaced points on the diagonal lines for showing the widths, and a slide movably mounted on the stick and having flanges extending beneath the stick with projections extending forward from the inner portions of the flanges to catch under the side of the stick, the central top portion of the slide being extended to catch over the side part of the stick, said central projecting portion of the slide being provided with a window and an index therein, said slide also provided with an upstanding notched lug adjacent the index and said slide further provided at its rear edge with a transversely extending scale having markings at the rear edge of the slide adapted to be read in conjunction with the diagonal lines of the width markings.

HARRY N. WHEELER.